United States Patent [19]
Olivier

[11] Patent Number: 5,397,835
[45] Date of Patent: Mar. 14, 1995

[54] POLYAMIDE THERMOPLASTIC ELASTOMER OBTAINED BY BLENDING

[75] Inventor: Errol J. Olivier, Baton Rouge, La.

[73] Assignee: Copolymer Rubber & Chemical Corporation, Baton Rouge, La.

[21] Appl. No.: 126,432

[22] Filed: Sep. 24, 1993

Related U.S. Application Data

[60] Continuation of Ser. No. 625,874, Dec. 11, 1990, abandoned, which is a division of Ser. No. 185,108, Apr. 22, 1988, Pat. No. 5,003,003.

[51] Int. Cl.6 .............................................. C08L 77/00
[52] U.S. Cl. ....................................... 525/66; 525/179
[58] Field of Search ........................................... 525/66

[56] References Cited

U.S. PATENT DOCUMENTS 4,956,501  9/1990  Sunseri et al. ..................... 525/64
5,008,342  4/1991  Phadke ............................... 525/263
5,237,003  8/1993  Otawa et al. ....................... 525/66

Primary Examiner—Ana L. Carrillo
Attorney, Agent, or Firm—Rockey, Rifkin and Ryther

[57] ABSTRACT

Novel thermoplastic elastomer compositions, made by dispersing a polyolefin elastomer phase containing functionalized EPM or EPDM in a polyamide resin followed by cross-linking of the elastomer phase, are described. The cross-linked phase exists as discreet particles, providing an overall blend which remains thermoplastic. The resulting blend may be used in the fabrication of elastomeric goods without the need for a separate vulcanization step after the desired object is formed.

13 Claims, No Drawings

POLYAMIDE THERMOPLASTIC ELASTOMER OBTAINED BY BLENDING

This is a continuation of application Ser. No. 07/625,874, filed on Dec. 11, 1990, now abandoned, which is a divisional of application Ser. No. 07/185,10, filed Apr. 22, 1988, issued as U.S. Pat. No. 5,003,003 on Mar. 26, 1991.

FIELD OF THE INVENTION

This invention relates to polyamide-hydrocarbon elastomer blends having improved physical and mechanical properties. More particularly, this invention relates to blended polyamide thermoplastic elastomers having improved tensile strength, elongation and oil resistance properties.

BACKGROUND OF THE INVENTION

Thermoplastic elastomers are typically materials which exhibit properties intermediate between those of crystalline or glassy plastics and soft rubbers. To be considered thermoplastic they must soften upon heating such that in the softened state they are capable of being shaped by flow into articles by molding or extrusion, and upon cooling they must resolidify in order to maintain their molded or extruded shape.

Among the thermoplastic elastomers that have become commercially important a number are based upon physical blends of plastics and elastomers. Examples of these are described in U.S. Pat. Nos. 3,806,558, 3,835,201, 3,957,919, 4,130,535 and 4,311,628, all of which teach compositions which are comprised of polyolefin resins containing either uncured, partially cured, or fully cured polyolefin elastomers. Such compositions exhibit useful properties largely because of the compatibility that exists between hydrocarbons of similar chemical structure. The above cited patents also teach that further improvement in physical properties such as tensile strength, elongation, and tension set is realized when the elastomer phase is well dispersed into small particles of fixed size by virtue of curing the elastomer in its dispersed state without curing the plastic so as to maintain its thermoplasticity.

Thermoplastic polyamide resins and improvements in the physical and mechanical properties thereof have been made the subject matter of research and development over a considerable period of time. Much of such earlier reseach and development has been addressed to the admixture of the polyamides with a variety of additives, including rubber-like or elastomeric materials, such as ethylene-propylene copolymers (EPM) or ethylene-propylene polyene terpolymers (EPDM), and other modified and unmodified resins with various degrees of success. The desired level of improvement has not been achieved with the addition of such elastomeric materials due primarily to the relative incompatibility between the elastomeric materials and the polyamide resins.

Attempts have been made to overcome this problem and increase the compatibility between the hydrocarbon elastomeric materials and the polar polyamide resins by modification of the elastomeric materials to provide reactive sites that enable the polyamide resins to adhere to the elastomeric materials.

For example, blends of hydrocarbon rubbers in polyamide plastics are taught in U.S. Pat. No. 4,594,386. In that patent the inherent incompatibility between the hydrocarbon rubber and the polar nylon is overcome by grafting the rubber with maleic anhydride, such that compatibility is achieved by reaction of the grafted anhydride groups on the rubber with the amino end groups of the nylon. The '386 patent, however, addresses rigid nylon molding compositions having improved impact strength, rather than flexible thermoplastic elastomer compositions, and teaches that the elastomer level is limited to below 50 percent. Furthermore, there is no teaching that additional improvement in the properties of the compositions may be obtained from cross-linking of the dispersed rubber.

Thermoplastic elastomer compositions of a modified EPDM rubber and nylon are taught in U.S. Pat. No. 4,017,557. The compositions of that patent, however, are restricted to uncured blends of modified EPDM polymers with low molecular weight nylons having a degree of polymerization of less than 60. The patent does not teach or suggest the benefit that might be realized from cross-linking the dispersed rubber particles, nor does it suggest that useful properties might be achieved with typical commercial molding and extrusion grade nylons having degrees of polymerization in the range of 100-400.

U.S. Pat. No. 4,338,413 teaches thermoplastic elastomer compositions which are comprised of blends of polyolefin plastics containing dispersed fully cured particles of a hydrocarbon elastomer with polyamide plastics containing dispersed fully cured particles of a polar elastomer. Compatibility is achieved through the addition of a functionalized olefin polymer. The patent, however, does not teach compositions in which the plastic component is taken from a single class of polymers, i.e., polyamides, nor does it teach polyamide thermoplastic elastomer compositions containing only hydrocarbon elastomers.

SUMMARY OF THE INVENTION

It has been found, in accordance with the practice of this invention, that marked improvement in tensile strength, elongation, and oil resistance of polyamide-hydrocarbon elastomer blends can be achieved by dispersing in the polyamide resin a functionalized hydrocarbon elastomer having amine reactive groups and, optionally, additional non-functionalized vulcanizable hydrocarbon elastomer, and then cross-linking the dispersed elastomer. The polyamide thermoplastic elastomer blends of this invention comprise from 10-70 percent by weight of the polyamide resin and from 30-90 percent by weight of the elastomer. The polyamides useful in the invention are typical commercial molding and extrusion grade nylons having degrees of polymerization in the range of 100-400.

There are a number of criteria which should be followed in order to achieve the desired results sought to be obtained by the practice of this invention. It is important that the functionalized hydrocarbon elastomer be sufficiently gel free prior to blending with the nylon resin to obtain a suitable dispersion of the rubber in the resin. Suitable methods for preparing grafted hydrocarbon elastomers having a low gel content are described in my co-pending applications U.S. Ser. No. 716,672, now allowed, and U.S. Ser. No. 858,890.

The functionalized hydrocarbon elastomer may be a chemically modified polymer or a graft copolymer made by polymerizing a di-functional monomer having an amine reactive group in the presence of the base hydrocarbon polymer. Examples of the first type include EPDM polymer that has been thermally adducted with maleic anhydride as described in U.S. Pat. No. 3,884,882, EPM or EPDM polymer that has been reacted with mercaptans or azides having amine reactive groups and EPM chemically modified with methylol phenol groups. Examples of the second type of functionalized hydrocarbon elastomer include EPM or EPDM polymers grafted with difunctional monomers having amine reactive groups such as maleic anhydride and glycidyl methacrylate. These may be prepared either in solution or by bulk polymerization grafting in extruders or internal mixers.

The only restriction placed upon the polyamide resin is that it contain sufficient amine groups to react with the amine reactive groups on the functionalized hydrocarbon rubber, thereby enhancing the compatibility between the non-polar hydrocarbon rubber and the polar nylon plastic. In general the chemistry of polyamide synthesis is such that chains having amine groups at either or both ends may be obtained. In the practice of this invention a resin of either type or a mixture thereof would be acceptable provided that the degree of reaction between the elastomer and the nylon does not reduce the thermoplasticity of the product to an unacceptable level.

DETAILED DESCRIPTION OF THE INVENTION

As used herein, the term "Polyamide resin" includes all polymers having recurring carbonamide groups in the main chain, and having molecular weights greater than 2000, and preferably in the range of 10,000–40,000. "Molecular weight", as used herein, refers to number average molecular weight for polyamides (see Flory "Principles of Polymer Chemistry", page 273, published 1953 by Cornell University Press). The preferred molecular weight corresponds to degrees of polymerization in the range of 100–400.

The polyamide resin is ordinarily produced by condensation of equimolar amounts of dicarboxylic acid or acid derivative containing from two to twenty carbon atoms, with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon 6.6), polycaprolactam (nylon 6), poly(undecaneamide) (nylon 11), poly(dodecaneamide)(nylon 12) polyhexamethylene sebacamide (nylon 6.10), polyhexamethylene isophthalamide, polyhexamethylene tereco-isophthalamide, and mixtures or copolymers thereof.

Polyamides of the type described have been marketed by Allied Corporation under the trade name Capron, by E.I. dupont de Nemours Company under the trade name Zytel, and by Rilsan Corporation under the designation BMNO. The resins are typically crystalline and high melting. The useful features of this invention, however, are not limited to crystalline polyamides and may also apply to glassy amorphous polyamides such as the aramides marketed by Emser Industries, Inc. under the trade name Grilamid.

Suitable base hydrocarbon elastomers of the instant invention are copolymers of ethylene, an alpha-olefin, and optionally a non-conjugated diene. Examples of such hydrocarbon elastomers are those marketed by Copolymer Rubber and Chemical Corporation under the tradename EPsyn and those marketed by E.I. duPont de Nemours and Company under the tradename Nordel. Persons familiar with the art will recognize that the techniques of this invention are general enough to be applied to compositions which make use of other, substantially hydrocarbon elastomers, especially butyl rubber, bromo or chlorobutyl rubbers, and styrene block copolymers with butadiene and isoprene, especially the hydrogenated styrene block copolymers.

As the component grafted onto the EPM rubbery copolymer, it is preferred to make use of maleic anhydride, but other unsaturated dicarboxylic acid anhydrides, di-acids, or mixed acid/esters may be used having the general formula

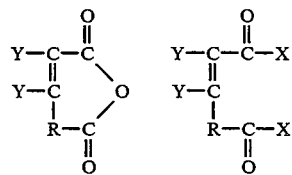

in which R is an alkylene group having from 0–4 carbon atoms and Y is preferably hydrogen but may be an organic group such as a branched or straight chain alkyl group, heterocyclic or other organic group of 1–12 carbon atoms, a halogen group such as chlorine, bromine, or iodine and in which at least one, and preferably both of the X groups are hydroxyl but in which one of the X groups may be an alkoxy or aryloxy group having from 1–8 carbon atoms.

For example, the maleic anhydride in the following examples may be substituted in whole or in part with equal molecular equivalents of other unsaturated dicarboxylic acids or anhydrides, such as itaconic acid or anhydride, fumaric acid, maleic acid and the like.

The grafting reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumene hydroperoxide, t-butylperbenzoate or other free radical source capable of hydrogen abstraction, as represented by alkyl peroxy esters, alkyl peroxides, alkyl hydroperoxides, diacylperoxides and the like. The amount of catalyst as well as reaction conditions will vary with the choice of catalyst.

The desired results are achieved when the amount of anhydride or diacid grafted onto the EPM polymer is within the range of 0.2–5 percent by weight of the base polymer and preferably in an amount within the range of 0.5–4 percent graft. In general, the amount grafted onto the polymer will represent only 30–50 percent of the graft material reacted with the polymer. For example, to achieve a graft of 4 percent maleic anhydride onto a preformed EPM polymer, a charge of about 10 percent maleic anhydride will be required.

As the component grafted onto the EPDM polymer, it is preferred to make use of glycidyl methacrylate, although other epoxy compounds having the following general formula may be used:

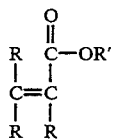

in which R' is an organic group having an epoxide functionality and R is hydrogen, methyl, ethyl, propyl or other alkyl, aralkyl, cyclic, or aromatic group. Representative of such other modifying agents are glycidyl acrylate, glycidyl 2-ethylacrylate, glycidyl 2-propylacrylate and the like.

The grafting reaction is carried out in the presence of a catalyst that favors grafting over a cross-linking reaction under the reaction conditions to combine the glycidyl methacrylate with the unsaturated backbone rubber. For this purpose, it is preferred to make use of a free radical initiator such as a dialkyl peroxide. In the grafting reaction, use can be made of the catalyst in an amount within the range of 1–5 parts per 100 parts by weight of the unsaturated rubber, and preferably in an amount within the range of 1–2 percent by weight.

The level of the graft of the glycidyl methacrylate onto the unsaturated backbone rubber is somewhat dependent on the amount of unsaturation in the backbone rubber. It is desirable to make use of an ethylene, mono-olefin, polyene backbone rubber having at least two unsaturated carbon-to-carbon linkages per 1000 carbon atoms and little additional benefit is derived from the use of an unsaturated backbone rubber having more than 20 carbon-to-carbon double bonds per 1000 carbon atoms. In the preferred practice of this invention, use is made of an unsaturated rubber having from 4–10 carbon-to-carbon double bonds per 1000 carbon atoms or which provide for a level of graft within the range of 1–10 percent and preferably 1.5–4 percent by weight of the rubber.

The grafting reaction may be carried out in solvent solution with the unsaturated rubber present in a concentration which may range from 10–30 percent by weight, with constant stirring, at an elevated temperature within the range of 125°–200° C. for a time ranging from ½–2 hours. The reaction condition can be varied depending somewhat upon the type and amount of catalyst and temperature condition, as is well known to the skilled in the art.

It is widely known that unmodified EPM and EPDM rubbers produce non-homogenous blends having no property enhancements when admixed with polyamide resins. This is possibly because of incompatibility of the EPM and EPDM rubbers due to their inherent non-polar nature. On the other hand, the functionalized elastomers described herein provide homogenous blends with polyamide resins which, after cross-linking of the dispersed elastomer, yield a product with significant improvement in tensile strength and elongation.

The improved tensile strength and elongation properties are obtained with a blend of polyamide resin and functionalized hydrocarbon elastomer in the ratio of 30-90 percent by weight of the elastomer per 70-10 percent by weight of the polyamide resin, and preferably in the ratio of 40-90 percent by weight of the elastomer per 60-10 percent by weight of the polyamide resin.

Such blends are prepared using equipment that is suitable for blending molten polymers. This includes melt processing equipment such as Brabender and Banbury mixers, heated roll mills, extruders, and the like.

The mixing should be carried out at a temperature above the melting or softening point of the polyamide resin. Generally, the mixing is carried out at temperatures in the range of 190°–300° C. Addition of any curatives should be withheld until the rubber and polyamide resin are suitably mixed. The curatives may be, for example, peroxide cures, such as those sold under the designation Varox, metal cures, such as zinc stearate, calcium stearate, zinc oxide or magnesium oxide, sulfur or sulfur donor cures, as well as phenolic resin cures, such as those used for curing butyl rubber. Use can also be made of excess functionality on the functionalized hydrocarbon. For example, maleic anhydride or glycidyl methacrylate functional elastomer might be cross-linked by addition of compounds containing two or more amine, epoxide, alcohol or carboxylic acid groups. This amounts to crosslinking via chemical reaction of the amine reactive groups on the functionalized hydrocarbon elastomer. The amount of curative will vary according to the type of cure and the composition of the blend. Other compounding ingredients such as oils, plasticizers, flame retardants, stabilizers, and fillers optionally may be added to further modify the final properties of the composition. Blending time should be long enough to achieve suitable dispersion of the components and long enough as well to achieve the desired degree of cure.

The teachings of the invention will now be illustrated by the following examples, which are in no way intended to be limiting.

Example 1 illustrates the preparation of an amine reactive hydrocarbon elastomer.

EXAMPLE 1

The starting polymer is an amorphous ethylene/propylene rubber having 55 mole percent ethylene, 1.92 RSV as measured on a 0.1% solution in decalin at 135° C., and a Mooney viscosity of ML (1+4) 20 at 257° F. The melt flow index of the starting rubber was found to be 2.5 g/10 minutes under Condition L of ASTM D1238.

A 17.1 weight percent solution of the starting rubber (29.1 kg) in dry hexane was heated to 156° C. in a sealed, agitated 80-gallon stainless steel reactor. Maleic anhydride (1998 g) in 11.4 liters toluene was pressured into the reactor. After allowing for mixing of the monomer, 436 g dicumyl peroxide (Hercules Di-Cup T) in 1.9 liters hexane was pressured into the reactor. The temperature and pressure were held at 156°–158° C. and 126–138 psig, respectively, for 60 minutes. After cooling of the mixture, the product was steam coagulated and dried at 65°–80° C. before use. Tritrimetric analysis of a purified sample indicated 1.7 weight percent bound maleic anhydride.

Examples 2–8 illustrate thermoplastic polyamide elastomer (TPE) compositions of the instant invention.

Procedure

The mixtures were prepared in a Brabender Plasticorder mixing head operating at 75 RPM using the cam rotors. Operating temperature was 195° C. in the case of Nylon 11 mixtures and 230°–240° C. in the case of Nylon 6 mixtures. In a typical procedure the rubber and resin were mixed for three minutes after the resin melted; then the curatives were added. Curing of the rubber was evidenced by an increase in torque as noted on the Brabender chart recorder. Mixing was continued for five minutes after the last ingredient was added. The batch was dumped, cut into small pieces, and remixed for an additional two minutes to insure homogeneity. In the case of uncured blends, the compositions were mixed for 8-10 minutes, dumped, and then remixed for two minutes.

Peroxide cures were effected using commercial Varox 50% active powder. Sulfur cures were obtained using 5 phr (parts per hundred parts rubber) ZnO, X/2 phr methyl tuads, X/4 phr MBTS, and X phr sulfur in the order stated with 30 second-1 minute intervals between ingredients.

The blends were pressed into 75 mil thick tensile sheets at 425° F. (Nylon 11) or 450° F. (Nylon 6). Dumbells were cut from the tensile sheets and pulled at 2"/minute. Other tests such as oil volume swell, and hardness were run on samples cut from the plaques, according to ASTM procedures or slight variations thereof. Oil volume swells were carried out for 72 hours at 212° C. in ASTM #3 oil.

EXAMPLE 2

Table I shows the effect of resin level on properties for uncured compositions of the elastomer of Example 1 and a commercial Nylon 11 molding resin (RilSan BMNO). It is noted that increasing the resin level raises the tensile strength, hardness, and resistance to oil, but lowers the ultimate elongation.

TABLE I

| | Uncured TPE Compositions | | | | | |
|---|---|---|---|---|---|---|
| Example | Resin | Elastomer | TS (psi) | % Elong | Shore D Hardness | Vol. Swell |
| 2A | 30 | 70 | 231 | 95 | — | 262 |
| 2B | 40 | 60 | 580 | 85 | — | 150 |
| 2C | 50 | 50 | 668 | 45 | 36 | 79 |
| 2D | 60 | 40 | 1714 | 30 | 52 | 37 |
| 2E | 70 | 30 | 2128 | 20 | 58 | 8 |
| Nylon | 100 | 0 | 5291 | 20 | 72 | .2 |

EXAMPLE 3

The compositions of Table II include the same rubber and resin as in Example 2. In addition the compositions were dynamically cured using 7 parts peroxide per 100 parts rubber. In comparison with the compositions of Example 2, the addition of the peroxide produces higher tensile strength and hardness, and lower oil volume swell. The compositions are completely thermoplastic and appear on visual inspection to be completely compatible.

TABLE II

| | Peroxide Cured TPE's | | | | | |
|---|---|---|---|---|---|---|
| | Composition (parts) | | Properties | | | |
| Example | Resin | Elastomer | TS (psi) | Elongation | Shore D Hardness | Vol. Swell |
| 3A | 30 | 70 | 277 | 63 | 27 | 158 |
| 3B | 40 | 60 | 1308 | 125 | 37 | 82 |
| 3C | 50 | 50 | 1607 | 60 | 47 | 46 |
| 3D | 60 | 40 | 2056 | 30 | 55 | 27 |
| 3E | 70 | 30 | 2884 | 33 | 62 | 5 |

EXAMPLE 4

The compositions of Table III include the same rubber and resin of Example 2. In addition the compositions contained added metal salts at a level of 5 parts salt per 100 parts rubber. The examples show that the addition of the metal curing agents improves tensile strength, elongation, and volume swell.

TABLE III

| | Metal Cured TPE's | | | | | |
|---|---|---|---|---|---|---|
| Example | Resin | Elastomer | Metal Agent | TS (psi) | % Elong | Shore D Hardness | Vol. Swell |
| 4A | 50 | 50 | none | 1034 | 75 | 36 | 78 |
| 4B | 50 | 50 | Zinc Stearate | 1523 | 100 | 40 | 27 |
| 4C | 50 | 50 | ZnO | 1705 | 100 | 40 | 16 |
| 4D | 50 | 50 | MgO | 2176 | 150 | 42 | 15 |
| 4E | 50 | 50 | Calcium Stearate | 1441 | 90 | 40 | 29 |

EXAMPLE 5

Table IV lists compositions which demonstrate the added benefit derived from the inclusion of EPDM in the formulation. From 15-50 percent by weight of the ungrafted EPDM may be added to the polyamide thermoplastic compositions. The nylon and maleic grafted EPM are the same as in Example 2. The ungrafted EPM is an ethylene/propylene copolymer having an RSV of 2.8 and containing 55 mole percent ethylene. The EPDM is a 2.3 RSV terpolymer of ethylene, propylene, and ethylidene norbornene having a 65:35 molar ratio of ethylene to propylene and containing 8.5 percent by weight ethylidene norbornene. It is reasoned that the compatibility between the ungrafted EPDM and the nylon is provided by the presence of the maleic grafted EPM. The added improvements in properties are reasoned to be derived from the higher cross-link density obtained from EPDM vs. EPM for a given level of curative. EPDM is recognized to be faster curing than EPM because it contains carbon-carbon double bonds. Other hydrocarbon elastomers which cure faster or provide a higher crosslink density than EPM would be expected to provide the same benefit.

Other features of Table IV that should be noted are as follows. Examples 5A, 5F, and 5J serve as controls and demonstrate the fact that poor properties are obtained in the absence of the amine reactive elastomer, i.e., the grafted EPM. Examples 5 G-I demonstrate that cures which require the presence of double bonds can be used effectively when EPDM is included. Additionally some improvement in properties is noted with increasing levels of curatives. It should also be pointed out that the apparent low volume swell for the control 5A is somewhat misleading. Instead of swelling due to absorption of oil, that sample lost weight because rubber was extracted by the oil. All of the control samples had a laminated appearance, whereas all of the samples containing amine reactive elastomer were uniform in structure.

TABLE IV

EPM/EPDM/Nylon TPE'S

| | Composition (parts) | | | | Properties | | | |
|---|---|---|---|---|---|---|---|---|
| Ex. | Resin | Grafted EPM | Ungrafted EPM | EPDM | Cure[1,2] | TS (psi) | % Elong | Shore D Hardness | Vol. Swell |
| 5A | 50 | 0 | 25 | 25 | none | 665 | 25 | 27 | 11 |
| 5B | 50 | 25 | 0 | 25 | none | 935 | 50 | 43 | 65 |
| 5C | 50 | 25 | 0 | 25 | 3P | 1881 | 125 | 47 | 48 |
| 5D | 50 | 25 | 0 | 25 | 5P | 2283 | 163 | 47 | 43 |
| 5E | 50 | 25 | 0 | 25 | 10P | 2719 | 200 | 49 | 42 |
| 5F | 50 | 0 | 25 | 25 | 10P | 1610 | 35 | 52 | 40 |
| 5G | 50 | 25 | 0 | 25 | .5S | 2341 | 200 | 45 | 52 |
| 5H | 50 | 25 | 0 | 25 | 1S | 2759 | 245 | 47 | 53 |
| 5I | 50 | 25 | 0 | 25 | 2S | 2567 | 225 | 45 | 47 |
| 5J | 50 | 0 | 25 | 25 | 2S | 858 | 50 | 42 | 68 |

[1]XP = parts Varox powder (40% active on clay) per 100 parts rubber (phr).
[2]XS = 5 phr ZnO, X/2 phr methyl tuads, X/4 phr MBTS, X phr sulfur added in the order stated.

EXAMPLE 6

Table V demonstrates the effect of resin level on properties for compositions of the type described in Example 5. Again it is seen that increasing resin levels result in higher tensile strength, higher hardness and better resistance to oil.

TABLE V

Effect of Resin Level on Properties of EPM/EPDM/Nylon TPE's

| | Compositions (parts) | | | | | | | |
|---|---|---|---|---|---|---|---|---|
| Examples | Resin | Grafted EPM | EPDM | Cure[1] | TS (psi) | % Elong | Shore D Hardness | Vol. Swell |
| 6A | 30 | 35 | 35 | none | 323 | 125 | 22 | 256 |
| 6B | 40 | 30 | 30 | none | 490 | 100 | 30 | 141 |
| 6C | 50 | 25 | 25 | none | 935 | 50 | 43 | 65 |
| 6D | 60 | 20 | 20 | none | 1822 | 35 | 55 | 30 |
| 6E | 70 | 15 | 15 | none | 2671 | 25 | 62 | 8 |
| 6F | 30 | 35 | 35 | 10P | 1118 | 120 | 32 | 90 |
| 6G | 40 | 30 | 30 | 10P | 2230 | 175 | 42 | 59 |
| 6H | 50 | 25 | 25 | 10P | 2719 | 200 | 49 | 42 |
| 6I | 60 | 20 | 20 | 10P | 3497 | 225 | 60 | 17 |
| 6J | 70 | 15 | 15 | 10P | 4140 | 250 | 65 | 4 |
| 6K | 30 | 35 | 35 | 2S | 984 | 175 | 32 | 112 |
| 6L | 40 | 30 | 30 | 2S | 1889 | 190 | 38 | 78 |
| 6M | 50 | 25 | 25 | 2S | 2567 | 225 | 45 | 47 |
| 6N | 60 | 20 | 20 | 2S | 3215 | 250 | 57 | 26 |
| 6O | 70 | 15 | 15 | 2S | 3451 | 225 | 62 | 5 |

[1]As in TABLE IV.

EXAMPLE 7

Table VI describes compositions based upon the elastomer of Example 1 (Grafted EPM), an EPDM having an RSV of 2.8 with an ethylene:propylene ratio of 65:35, also with an ethylidene norbornene content of 4 weight percent, and a commercial Nylon 6 molding resin (Capron 8202C, Allied Plastics).

TABLE VI

EPM/EPDM/Nylon 6 TPE

| | Composition (parts) | | | | Properties | | |
|---|---|---|---|---|---|---|---|
| Example | Resin | Grafted EPM | EPDM | Cure[1] | TS (psi) | % Elong | Shore A Hardness |
| 7A | 35 | 35 | 30 | none | 236 | 50 | 72A |
| 7B | 35 | 35 | 30 | 2S | 1132 | 200 | 75A |

[1]As in Table IV.

EXAMPLE 8

Table VII illustrates the effect of a nylon plasticizer on the composition properties. The rubber and resin are those of Example 6. The plasticizer is nonyl phenol.

TABLE VII

Effect of Plasticizer

| | Compositions (parts) | | | | | Properties | | |
|---|---|---|---|---|---|---|---|---|
| Example | Resin | Grafted EM | EPDM | Nonyl Phenol | Cure[1] | TS (psi) | % Elong | Shore D Hardness |
| 8A | 50 | 25 | 25 | 0 | 5P | 2719 | 200 | 49 |

TABLE VII-continued

| | Effect of Plasticizer | | | | | | |
|---|---|---|---|---|---|---|---|
| | Compositions (parts) | | | | Properties | | |
| Example | Resin | Grafted EM | EPDM | Nonyl Phenol | Cure[1] | TS (psi) | % Elong | Shore D Hardness |
| 8B | 40 | 20 | 20 | 20 | 5P | 1925 | 300 | 40 |

[1] As in Table IV.

It will be apparent from the foregoing that marked improvement in tensile strength and elongation can be achieved, in accordance with the practice of the invention, by blends that are formed of polyamide resins and functionalized elastomeric materials and in which the dispersed elastomeric materials have been cross-linked. It will be understood that additional improvement in the properties may be obtained through the addition of a non-functionalized faster curing elastomeric material prior to cross-linking of the dispersed elastomeric material. It will be understood further that changes may be made in the details of formulation and operation without departing from the spirit of the invention, especially as defined by the following claims.

What is claimed is:

1. A polyamide thermoplastic elastomer blend having improved tensile strength and elongation properties comprising (a) 40–90 percent by weight of a EPM or EPDM rubber which has been modified by having grafted thereto an epoxy component having the formula:

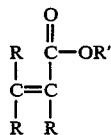

in which R' is an organic compound having an epoxide functionality and R is selected from the group consisting of hydrogen, an alkyl, aralkyl, cyclic or aromatic group, and (b) 60-10 percent by weight of a polyamide resin in which said rubber is dispersed, said rubber having been cross-linked after dispersion in said polyamide resin by a cross-linking agent selected from the group consisting of peroxides, metal stearates, metal oxides, phenolic resin and sulfur.

2. A polyamide thermoplastic elastomer blend according to claim 1, wherein the material grafted onto the EPM or EPDM is glycidyl methacrylate.

3. A polyamide thermoplastic elastomer blend according to claim 1 further comprising from 15–50 percent by weight of an unmodified hydrocarbon elastomer dispersed in said polyamide resin prior to the cross-linking of the modified rubber.

4. A polyamide thermoplastic elastomer blend according to claim 1 further comprising at least one modifer selected from the group consisting of flame retardants, stabilizers, fillers, plasticizers and oils.

5. A polyamide thermoplastic elastomer blend according to claim 1, wherein the polyamide is polycaprolactam.

6. A polyamide thermoplastic elastomer blend according to claim 1, wherein the polyamide is poly(undecaneamide).

7. A polyamide thermoplastic elastomer blend according to claim 1, wherein dispersion of the EPM or EPDM rubber takes place at a temperature in the range of 190°–300° C.

8. A method of producing polyamide elastomer blends having improved tensile strength and elongation properties comprising the steps of dispersing from 40–90 percent by weight of an EPM or EPDM rubber which has been chemically modified by having grafted thereto an epoxy component having the formula:

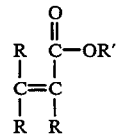

in which R' is an organic compound having an epoxide functionality and R is selected from the group consisting of hydrogen, an alkyl, aralkyl, cyclic or aromatic group, into 60-10 percent by weight of a polyamide resin and cross-linking said rubber after dispersion by means of a cross-linking agent selected from the group consisting of peroxides, metal stearates, metal oxides, phenolic resin and sulfur.

9. A method according to claim 8, further comprising dispersing 15–50 percent by weight of an unmodified hydrocarbon elastomer into said polyamide prior to the cross-linking step.

10. A method according to claim 8, wherein the material grafted onto the EPM or EPDM is glycidyl methacrylate.

11. A method according to claim 8, wherein dispersion of the EPM or EPDM rubber takes place at a temperature in the range of 190°–300° C.

12. A method according to claim 8 in which the polyamide thermoplastic elastomer blend is formed by reaction of the components in melt processing equipment.

13. A method according to claim 12 in which the components are reacted in melt processing equipment selected from the group consisting of an extruder, brabender plasticorder and banbury mixer.

* * * * *